US005548328A

United States Patent [19]
Wakefield

[11] Patent Number: 5,548,328
[45] Date of Patent: Aug. 20, 1996

[54] FILM SCANNER HAVING DRIVE BELTS FOR ADVANCING FILM THROUGH AN IMAGING STATION

[75] Inventor: Edward H. Wakefield, Rochester, N.Y.

[73] Assignee: Eastman Kodak Company, Rochester, N.Y.

[21] Appl. No.: 559,249

[22] Filed: Jul. 27, 1990

[51] Int. Cl.⁶ .................................................. H04N 5/253
[52] U.S. Cl. ............................................. 348/98; 348/207
[58] Field of Search ........................ 358/214, 54, 498, 358/474; 355/38, 47, 48, 49, 50; 352/105, 96; 353/109, 100, 111; 226/171; 348/98, 207, 209, 232, 239, 373, 374, 375, 96, 97, 98, 99, 100, 195; H04N 5/335

[56] References Cited

U.S. PATENT DOCUMENTS

| | | | |
|---|---|---|---|
| 2,314,027 | 3/1943 | Young | 178/11 |
| 2,412,246 | 12/1946 | Blumenstein | 353/112 |
| 2,939,362 | 6/1960 | Cole | 352/105 |
| 3,109,924 | 11/1963 | Frederick | 235/61.11 |
| 4,105,199 | 8/1978 | Sato et al. | 271/122 |
| 4,105,316 | 8/1978 | Söding | 353/109 |
| 4,281,351 | 7/1981 | Poetsch et al. | 358/214 |
| 4,292,621 | 9/1981 | Fuller | 340/146.3 H |
| 4,320,963 | 3/1982 | Satomi | 355/50 |
| 4,429,333 | 1/1984 | Davis et al. | 358/293 |
| 4,868,383 | 9/1989 | Kurtz et al. | 250/228 |

Primary Examiner—Wendy Garber
Assistant Examiner—Tuan V. Ho

[57] ABSTRACT

A film scanner is disclosed which comprises a dynamic film gate. The film gate includes a pair of rollers for supporting the film at an imaging station and a pair of drive belts which clamp the film against the rollers. The belts are driven to advance the film through the imaging station. An integrating cylinder located above the film gate produces a line of light on the film, and light transmitted through the film in imaged onto a linear CCD image sensor.

14 Claims, 2 Drawing Sheets

FILM SCANNER HAVING DRIVE BELTS FOR ADVANCING FILM THROUGH AN IMAGING STATION

REFERENCE TO RELATED APPLICATION

Reference is made to U.S. application Ser. No. 07/559,481, entitled "Film Scanner", filed in the name of Fetterman et al., and Ser. No. 07/559,249, filed in the name of Erck et al, on even date herewith. These applications are assigned to the assignee of the present invention.

1. Field of the Invention

This invention relates to a film scanner, and more particularly, to such a scanner having a dynamic film gate.

2. Background of the Invention

In various types of imaging apparatus, a photographic film must be clamped in a workstation while a particular operation is performed on the film. In certain types of apparatus, for example, film scanners, the film must be held extremely flat in order for an image on the film to be recorded properly. One problem in maintaining the film flat is that photographic film has a natural curl due to an emulsion coated on one side of the film. In one known type of film gate, a film is clamped against a flat platen, and the film and platen are moved relative to an image sensor to scan the film. In the use of such a film gate, the film must be clamped and unclamped for each film frame, and the film platen must be moved to a home position after each frame is scanned. Such a technique requires a significant number of moving parts, and it is relatively slow. Further, devices of this type are likely to scratch the film, and the motion of the platen introduces the possibility of vibrations into the system.

It is also known to use a rotary film gate, as disclosed, for example, in U.S. Pat. No. 4,281,351. U.S. Pat. No. 4,281,351 discloses apparatus for the line-by-line optical scanning of a film. In order to reduce friction of the film adjacent the scanning region, rollers or endless belts support the film at positions on the film outside of the film frames. A disadvantage of the apparatus disclosed in this patent is that the only means for maintaining the film flat in the scan region is through the tension in the film. Thus, any irregular motion in the drive system is transmitted to the film, and this tends to produce blurring in the scanned image. Further, the arrangement disclosed in the patent is not suitable for use with film strips which are too short to be mounted on the feed rollers.

SUMMARY OF THE INVENTION

It is an object of the present invention to overcome the problems in the prior art discussed above and to provide an improved film scanner.

In accordance with the present invention, there is provided a film scanner comprising: means for supporting a film at an imaging station; belt means for urging film against the support means, the belt means contacting the film along an edge thereof; illumination means for producing a line of light on the film as it is contacted by the supporting means and the belt means; and means for driving the belt means to advance the film relative to the illumination means.

In one embodiment of the present invention, the film scanner comprises a pair of rollers which support the film as it passes through an imaging station. The film is pressed against the rollers by a pair of belts, and the belts are driven to advance the film through the imaging station. An integrating cylinder provides a line of light on the film at the imaging station, and light transmitted through the film is imaged onto a CCD image sensor.

An advantage of the present invention is that the film is advanced at a constant rate through the imaging station. The film can be driven at a selected scan speed and at a fast frame-to-frame advance, since the same motion serves to scan the film and advance the film to the next scan area. Drive belts provide for dynamic clamping of the film in the imaging station, and use of the belts eliminates the need for tensioning the film in the imaging station. Further, the belts are arranged to wrap the film around a portion of the rollers in a direction to remove the inherent curl of the film; this makes the film very flat in the imaging station, and as a result-, imaging optics having a smaller depth of field can be used. The illumination device is located above the film so that line illumination can be provided across the entire width of the film image.

Other features and advantages will become apparent upon reference to the following Description of the Preferred Embodiment when read in light of the attached drawings.

DESCRIPTION OF THE PREFERRED EMBODIMENTS

Figure 1:
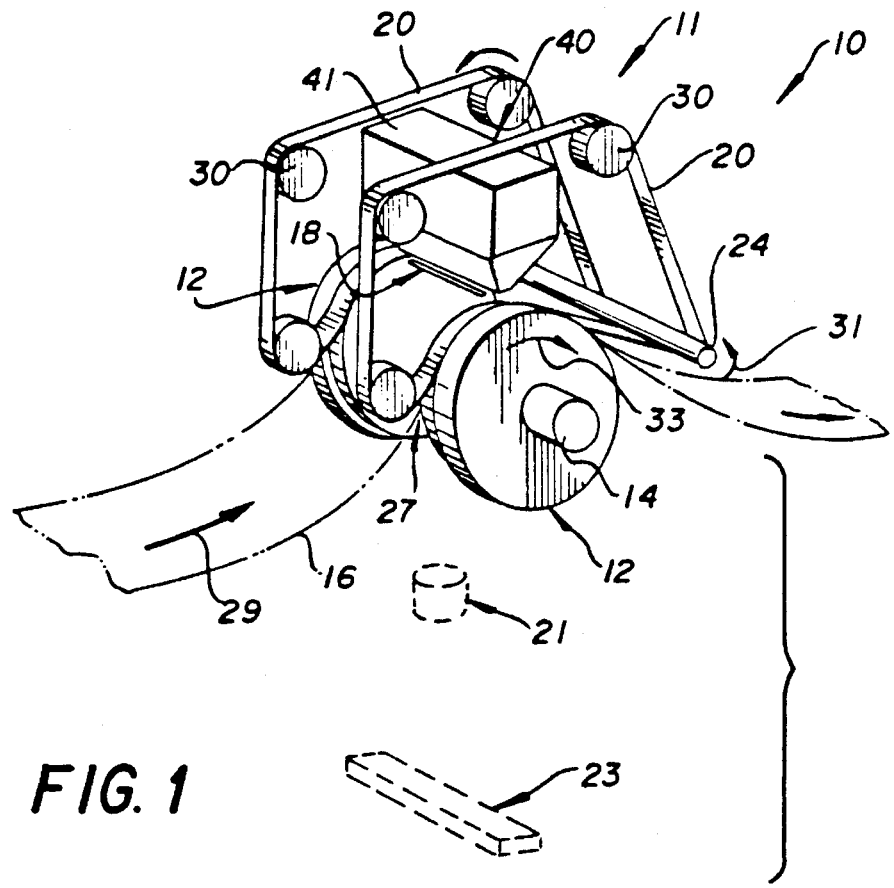
FIG. 1 is a perspective view of the film scanner of the present invention.

With reference to FIG. 1, there is shown a film scanner 10 which is constructed in accordance with the present invention. Film scanner 10 comprises a dynamic film gate 11 which is adapted to support a film 16 as it is moved through an imaging station indicated at 18, an illumination source 40 which is adapted to provide a line source of light at station 18, an imaging lens 21, and a linear CCD image sensor 23.

Figure 3:
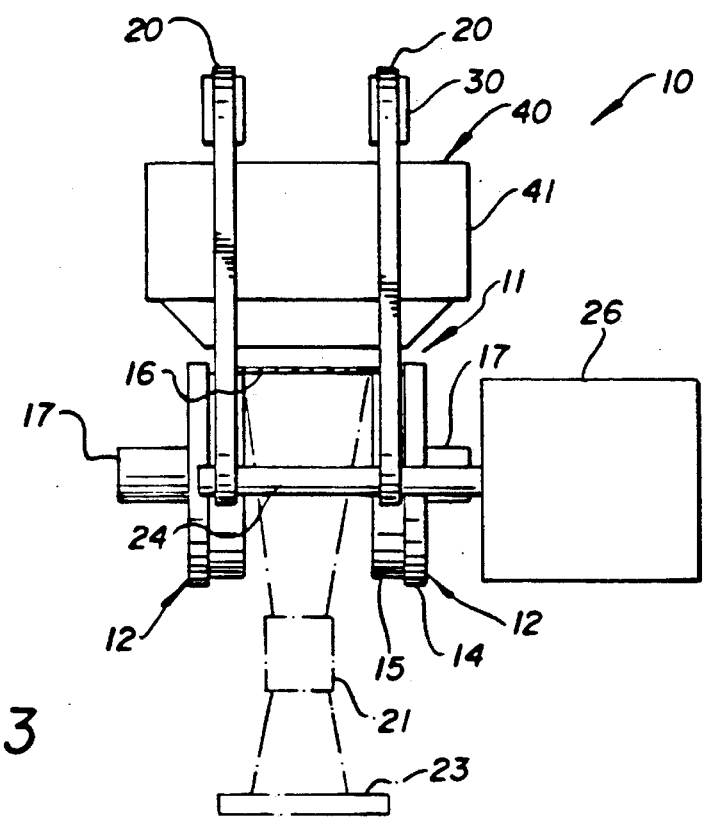
FIG. 3 is a side elevational view of the film scanner shown in FIG. 1.
Figure 2:
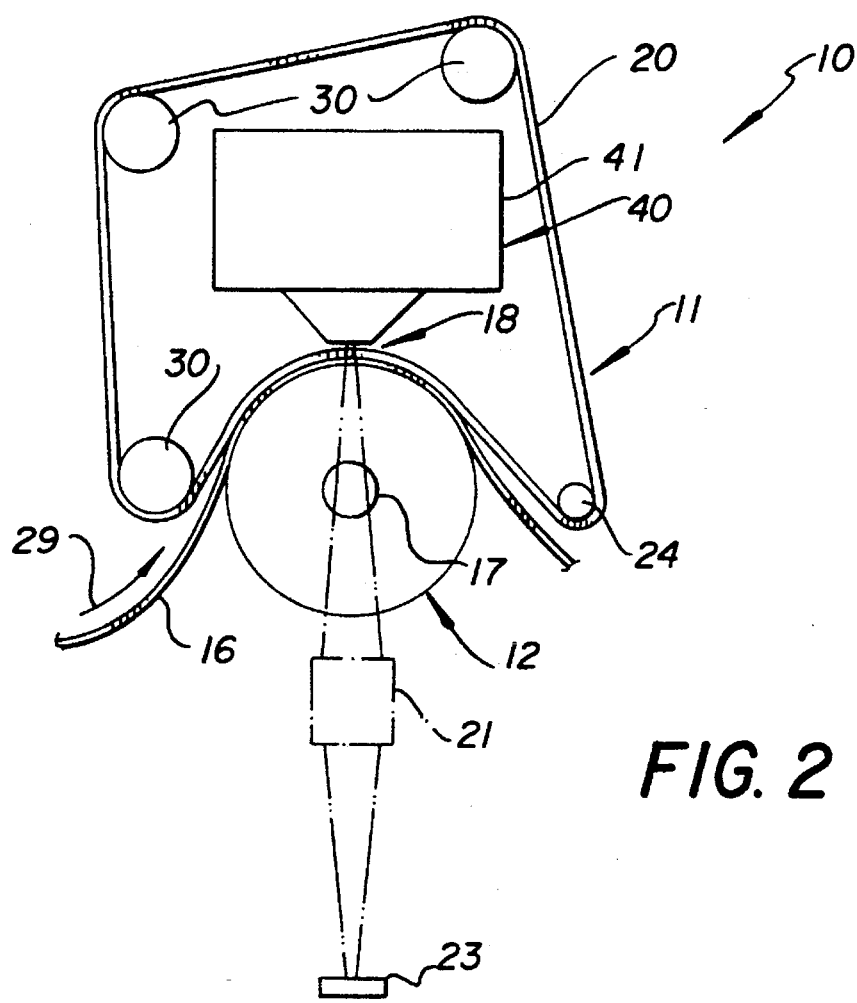
FIG. 2 is a front elevational view of the film scanner shown in FIG. 1.

Film gate 11 comprises a pair of rollers 12 and a pair of drive belts 20 which are adapted to clamp the film 16 against rollers 12 as the film is advanced through station 18. As shown in FIG. 3, each of the rollers 12 includes an outer cylindrical portion 14 and an inner cylindrical portion 15 of a reduced diameter. Each roller 12 includes a stub shaft 17 which is journalled in support structure (not shown) in the scanner 10. The rollers 12 are spaced such that the film 16 rides on the portions 15.

Figure 4:
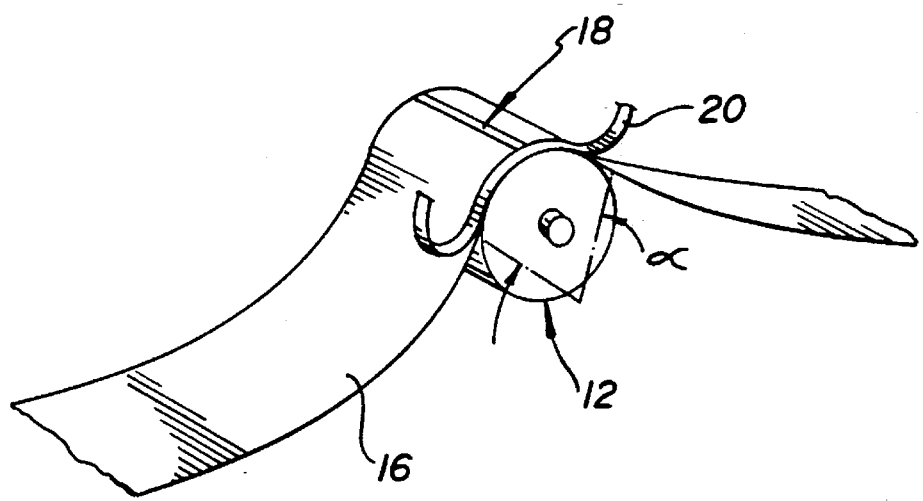
FIG. 4 is a schematic view illustrating the shape assumed by the film as it passes through the imaging station.

Belts 20 are made of a length sufficient to provide α wrap angle a (FIG. 4) of about 60° on a roller 12. Each of the belts 20 is trained around idler pulleys 30, a roller 12, and a shaft 24 which is connected to a drive motor 26 (FIG. 3). Motor 26 can be, for example, a DC servo motor of a type well known in the art.

Each belt 20 is relatively narrow so that it only contacts an edge of the film 16 and does not extend into the image area. The belts 20 can be constructed of a fiberglass core, or similar non-stretch material, which is coated on both sides with a urethane or similar high friction material. When film is fed to a nip 27 (FIG. 1) defined by rollers 12 and belts 20, a pinching action on the film 16 will capture the film 16 and pull it into the interface; the film 16 will be driven in the direction of arrow 29 as shaft 24 and rollers 12 move in the direction of arrows 31 and 33, respectively. The film 16 will be advanced a constant rate of speed which is controlled by the speed of motor 26.

Illumination source 40 is mounted above the film 16 and is adapted to provide a line of illumination at the imaging station 18. Light transmitted through the film is imaged onto linear CCD sensor 23 by means of lens 21. The illumination source 40 includes an integrating cylinder 41 and a lamp (not shown) such as a 24 V DC tungsten halogen lamp, type ELC, sold by General Electric Co. The integrating cylinder 41 can be, for example, an integrating cylinder as disclosed in U.S. Pat. No. 4,868,383, to Kurtz et al., granted Sep. 19, 1989. The integrating cylinder disclosed therein produces a line of diffuse illumination which has a uniform linear and angular distribution.

Image sensor 23 can be a linear CCD image sensor such as a No. KLI-5001A/B sensor, manufactured by Eastman Kodak Co., Rochester, N.Y. The image sensor can also include an array which consists of three separate photodiode linear arrays for capturing red, green, and blue signals. The image sensor 23 must be precisely located relative to scanning station 18, and to this end, it can be supported in a mount as disclosed in U.S. patent application Ser. No. 381,897, filed Jul. 19, 1990. Signals from image sensor 23 can be processed in a well known manner in order to produce an electronic record of the images on film 16.

In the operation of film scanner 10, a film 16, for example, a 35 mm film, is threaded into the gate 11, and the film is advanced therein by means of the belts 20 bearing on rollers 12. As the film 16 is advanced, the image is scanned in a page scan direction, and the line scan is performed by the clocking of the individual image elements in the sensor 23.

The invention has been described in detail with particular reference to the preferred embodiments thereof, but it will be understood that variations and modifications can be effected within the spirit and scope of the invention.

I claim:

1. A film scanner comprising:

roller means for supporting a film at an imaging station, said film having an image area;

belt means for urging said film against said roller means, said belt means contacting said film along an edge thereof and being free of contact with said image area;

illumination means for producing a line of light on said film as said film is contacted by said roller means and said belt means at said imaging station; and means for driving said belt means to advance the film relative to said illumination means.

2. A film scanner, as defined in claim 1, wherein said roller means includes two rollers which are spaced to contact opposite edges of said film.

3. A film scanner, as defined in claim 2, wherein said belt means includes a first belt which is operable to hold film onto one of said rollers.

4. A film scanner, as defined in claim 3, wherein said belt means includes a second belt which is operable to hold film onto the other of said rollers.

5. A film scanner, as defined in claim 1, wherein said drive means includes a rotatably driven element which contacts said belt means.

6. A film scanner, as defined in claim 1, wherein said roller means is driven by said belt means.

7. A film scanner, as defined in claim 1, wherein said illumination means is located adjacent said belt means.

8. A film scanner, as defined in claim 7, wherein said illumination means includes an integrating cylinder.

9. A film scanner, as defined in claim 8, wherein said cylinder is located within said belt means.

10. A film scanner comprising:

a pair of spaced-apart rollers for supporting a film at an imaging station;

belt means for urging the film against said rollers, said belt means including a first endless belt which urges one edge of said film against one of said rollers and a second endless belt which urges an opposite edge of said film against the other of said rollers;

illumination means for producing a line of light on said film at said imaging station, said line of light extending between said edges, and said light being transmitted through said film;

means for driving said belt means to advance the film relative to said illumination means;

an image sensor for receiving light transmitted through said film; and means for imaging said light onto said sensor.

11. A film scanner, as defined in claim 10, wherein each of said rollers includes a first portion of one diameter and a second portion of a diameter less than said one diameter, and said film is supported on said second portions.

12. A film scanner, as defined in claim 11, wherein each of said belts is adapted to extend around a predetermined circumferential portion of a roller in order to clamp said film against the roller in said portion.

13. A film scanner, as defined in claim 12, wherein said circumferential portion extends around an angle of about 60°.

14. A film scanner comprising:

roller means for supporting a film at an imaging station;

belt means for urging said film against said roller means, said belt means including two belts that are spaced to contact opposite edges of said film;

illumination means for producing a line of light on said film as said film is contacted by said roller means and said belt means; and means for driving said belt means to advance the film relative to said illumination means.

* * * * *